(12) United States Patent
Reevell

(10) Patent No.: US 12,356,507 B2
(45) Date of Patent: Jul. 8, 2025

(54) AEROSOL-GENERATING DEVICE HAVING MULTIPLE POWER SUPPLIES

(71) Applicant: Altria Client Services LLC, Richmond, VA (US)

(72) Inventor: Tony Reevell, London (GB)

(73) Assignee: Altria Client Services LLC, Richmond, VA (US)

( * ) Notice: Subject to any disclaimer, the term of this patent is extended or adjusted under 35 U.S.C. 154(b) by 289 days.

(21) Appl. No.: 15/418,009

(22) Filed: Jan. 27, 2017

(65) Prior Publication Data

US 2017/0215477 A1 Aug. 3, 2017

Related U.S. Application Data

(63) Continuation of application No. PCT/EP2017/050507, filed on Jan. 11, 2017.

(30) Foreign Application Priority Data

Feb. 1, 2016 (EP) ..................................... 16153687

(51) Int. Cl.
*H05B 1/02* (2006.01)
*A24F 40/50* (2020.01)
(Continued)

(52) U.S. Cl.
CPC ........... *H05B 1/0227* (2013.01); *A24F 40/50* (2020.01); *A24F 40/90* (2020.01); *A24F 40/60* (2020.01);
(Continued)

(58) Field of Classification Search
CPC ........ A24F 47/008; A24F 40/50; A24F 40/95; A24F 40/30; C07D 207/273;
(Continued)

(56) References Cited

U.S. PATENT DOCUMENTS 4,765,348 A * 8/1988 Honeycutt .............. A24F 42/60
131/273
5,144,962 A * 9/1992 Counts .................. A24F 47/008
131/194
(Continued)

FOREIGN PATENT DOCUMENTS

CN 102438470 A 5/2012
CN 103281920 A 9/2013
(Continued)

OTHER PUBLICATIONS

_AA_Ni-CD_1000mAh_Rechargable_Batteries (Year: 2016).*
(Continued)

*Primary Examiner* — Tiffany T Tran
(74) *Attorney, Agent, or Firm* — Harness, Dickey & Pierce, P.L.C.

(57) ABSTRACT

An aerosol-generating device includes at least one electric heater and a first power supply configured to supply electrical energy only to the at least one electric heater. The aerosol-generating device also includes a controller configured to control the supply of electrical energy from the first power supply to the at least one electric heater and a second power supply configured to supply electrical energy to the controller.

7 Claims, 2 Drawing Sheets

(51) Int. Cl.
*A24F 40/90* (2020.01)
*A24F 40/60* (2020.01)
*H01M 16/00* (2006.01)

(52) U.S. Cl.
CPC ........ *H01M 16/00* (2013.01); *H01M 2220/30* (2013.01); *Y02E 60/10* (2013.01)

(58) Field of Classification Search
CPC .. C07D 213/30; C07D 213/36; C07D 213/55; C07D 213/61; C07D 213/73; C07D 213/76; C07D 233/34; C07D 471/04; H01M 16/00; H01M 2220/30; H01M 10/0525; H01M 10/44; H05B 1/0227; H05B 1/0244; H02J 7/0068; H02J 7/007
USPC ........ 131/328, 329; 392/386, 323, 338, 373, 392/463
See application file for complete search history.

(56) References Cited

U.S. PATENT DOCUMENTS

| | | | |
|---|---|---|---|
| 5,249,586 A | 10/1993 | Morgan et al. | |
| 5,666,977 A * | 9/1997 | Higgins | A24F 47/008 128/200.14 |
| 5,666,978 A * | 9/1997 | Counts | A24D 1/20 131/194 |
| 5,692,525 A * | 12/1997 | Counts | A24F 47/008 131/194 |
| 5,726,421 A | 3/1998 | Fleischhauer et al. | |
| 5,816,263 A | 10/1998 | Counts et al. | |
| 5,915,387 A | 6/1999 | Baggett, Jr. et al. | |
| 5,988,176 A | 11/1999 | Baggett, Jr. et al. | |
| 6,018,231 A | 1/2000 | Shaver et al. | |
| 6,026,820 A | 2/2000 | Baggett, Jr. et al. | |
| 6,154,007 A | 11/2000 | Shaver et al. | |
| 2009/0230117 A1 | 9/2009 | Fernando et al. | |
| 2010/0218560 A1* | 9/2010 | Heggelund | D04H 1/736 65/469 |
| 2010/0300297 A1* | 12/2010 | Ng | F02M 25/06 55/428.1 |
| 2011/0036346 A1 | 2/2011 | Cohen et al. | |
| 2012/0291791 A1 | 11/2012 | Pradeep | |
| 2013/0104916 A1 | 5/2013 | Bellinger et al. | |
| 2013/0336358 A1* | 12/2013 | Liu | G01K 13/20 374/152 |
| 2013/0340775 A1* | 12/2013 | Juster | H04L 67/42 131/273 |
| 2014/0000638 A1* | 1/2014 | Sebastian | A24F 47/008 131/328 |
| 2014/0014125 A1* | 1/2014 | Fernando | H02J 7/0068 131/328 |
| 2014/0096781 A1* | 4/2014 | Sears | A24F 40/50 131/328 |
| 2014/0097103 A1* | 4/2014 | Cameron | A24F 15/18 206/38 |
| 2014/0229137 A1 | 8/2014 | Rusnack et al. | |
| 2014/0270727 A1 | 9/2014 | Ampolini et al. | |
| 2014/0299137 A1 | 10/2014 | Kieckbusch et al. | |
| 2014/0305450 A1 | 10/2014 | Xiang | |
| 2014/0338685 A1 | 11/2014 | Amir | |
| 2015/0102777 A1* | 4/2015 | Cooper | H02J 7/342 320/137 |
| 2015/0128975 A1* | 5/2015 | Alarcon | H02J 7/0044 131/329 |
| 2015/0181942 A1* | 7/2015 | Holzherr | A24F 40/95 131/328 |
| 2015/0272218 A1* | 10/2015 | Chen | A61M 15/06 131/329 |
| 2015/0333542 A1* | 11/2015 | Alarcon | H02J 7/0045 131/328 |
| 2017/0086508 A1* | 3/2017 | Mironov | A24D 1/20 |
| 2017/0095003 A1* | 4/2017 | Mironov | A24F 40/50 |
| 2017/0156403 A1* | 6/2017 | Gill | A24F 40/42 |
| 2017/0207499 A1* | 7/2017 | Leadley | H01M 10/486 |
| 2017/0303581 A1* | 10/2017 | Schaller | A24B 15/16 |
| 2017/0325506 A1* | 11/2017 | Batista | A24F 40/465 |
| 2018/0271151 A1* | 9/2018 | Litten | H05B 1/0283 |
| 2018/0271152 A1* | 9/2018 | Silvestrini | A24B 15/167 |

FOREIGN PATENT DOCUMENTS

| | | |
|---|---|---|
| CN | 104584366 A | 4/2015 |
| CN | 104584366 B | 9/2017 |
| EP | 2100525 A1 | 9/2009 |
| EP | 2257195 A1 | 12/2010 |
| EP | 2468118 A1 | 6/2012 |
| EP | 2471392 A1 | 7/2012 |
| EP | 2701268 A1 | 2/2014 |
| KR | 10-2015-0129683 A | 11/2015 |
| KR | 10-2016-0008524 A | 1/2016 |
| KR | 10-2016-0098212 A | 8/2016 |
| KR | 10-2018-0111799 A | 10/2018 |
| WO | WO-9639879 A1 | 12/1996 |
| WO | WO-2008077271 A1 | 7/2008 |
| WO | WO-2009118085 A1 | 10/2009 |
| WO | WO-2009127401 A1 | 10/2009 |
| WO | WO-2011137453 A2 | 11/2011 |
| WO | WO-2011146329 A2 | 11/2011 |
| WO | WO-2012027350 A2 | 3/2012 |
| WO | WO-201272790 A1 | 6/2012 |
| WO | WO-2012085203 A1 | 6/2012 |
| WO | WO-2012085207 A1 | 6/2012 |
| WO | WO-2013060781 A1 | 5/2013 |
| WO | WO-2013060784 A2 | 5/2013 |
| WO | WO-2013098398 A2 | 7/2013 |
| WO | WO-2014040988 A2 | 3/2014 |
| WO | WO-2014138244 A1 | 9/2014 |
| WO | WO-2014150247 A1 | 9/2014 |
| WO | WO-2014166037 A1 | 10/2014 |
| WO | WO-2014166121 A1 | 10/2014 |
| WO | WO-2015/175700 A1 | 11/2015 |
| WO | WO-2015177255 A1 | 11/2015 |
| WO | WO-2016/058904 A1 | 4/2016 |

OTHER PUBLICATIONS

"Compartment", 2009, https://www.merriam-webster.com/dictionary/compartment (Year: 2009).*
International Search Report and Written Opinion for corresponding International Application No. PCT/EP2017/050507 dated May 10, 2017.
Extended European Search Report Application No. 16153687.5-1656 dated Apr. 8, 2016.
Russian Decision to Grant and Search Report for Application No. 2018131349, dated Apr. 28, 2020.
Office Action and Search Report issued Sep. 3, 2020 in Chinese Application No. 201780005885.6.
European Notice of Opposition dated Dec. 30, 2020 for corresponding European Application No. 17701062.6.
Office Action dated Jan. 4, 2021 issued in corresponding Japanese Patent Application No. 2018-537766.
Chinese Office Action dated Jun. 10, 2021 for corresponding Chinese Application No. 201780005885.6, and English-language translation thereof.
Japanese Notice of Allowance dated Sep. 8, 2021 for corresponding Japanese Application No. 2018-537766, and English-language translation thereof.
Office Action dated Sep. 18, 2023 issued in related Korean patent application No. 10-2018-7020512.
Notice of Allowance dated Jun. 1, 2024 issued in Korean patent application No. 2018-7020512.

* cited by examiner

AEROSOL-GENERATING DEVICE HAVING MULTIPLE POWER SUPPLIES

This is a continuation of and claims priority to PCT/EP2017/050507 filed on Jan. 11, 2017, and further claims priority to EP 16153687.5 filed on Feb. 1, 2016, the contents of each of which are hereby incorporated by reference in their entirety.

BACKGROUND

Some example embodiments relate to an aerosol-generating device comprising first and second power supplies. The aerosol-generating device forms part of an aerosol-generating system.

One type of aerosol-generating system is an electrically operated vaping system. Known handheld electrically operated vaping systems may comprise an aerosol-generating device comprising a battery, control electronics and an electric heater for heating an aerosol-forming substrate. The aerosol-forming substrate may be contained within part of the aerosol-generating device. The aerosol-generating device may comprise a liquid storage portion in which a liquid aerosol-forming substrate, such as a nicotine solution, is stored. Alternatively, the aerosol-forming substrate may form part of a separate aerosol-generating article designed specifically for use with the aerosol-generating device. In some example embodiments, the aerosol-generating article comprises an aerosol-forming substrate, such as a tobacco rod or a tobacco plug, and the heater contained within the aerosol-generating device is inserted into or around the aerosol-forming substrate when the aerosol-generating article is inserted into the aerosol-generating device. The aerosol-generating article may comprise a capsule containing an aerosol-forming substrate, such as loose tobacco.

A vaping experience of an adult vaper depends on a number of different factors, including the amount of aerosol-forming substrate remaining and the temperature to which the aerosol-forming substrate is heated, which in turn may depend on an electrical current supplied to the heater. It would be desirable to provide an aerosol-generating device that may provide a reliable and consistent vaping experience for an adult vaper.

SUMMARY

At least one example embodiment relates to an aerosol-generating device.

In at least one example embodiment, an aerosol-generating device comprises at least one electric heater and a first power supply configured to supply electrical energy only to the at least one electric heater. The aerosol-generating device further comprises a controller configured to control the supply of electrical energy from the first power supply to the at least one electric heater and a second power supply configured to supply electrical energy to the controller.

BRIEF DESCRIPTION OF THE DRAWINGS

Embodiments will be further described, by way of example only, with reference to the accompanying drawings in which.

DETAILED DESCRIPTION

Figure 1:
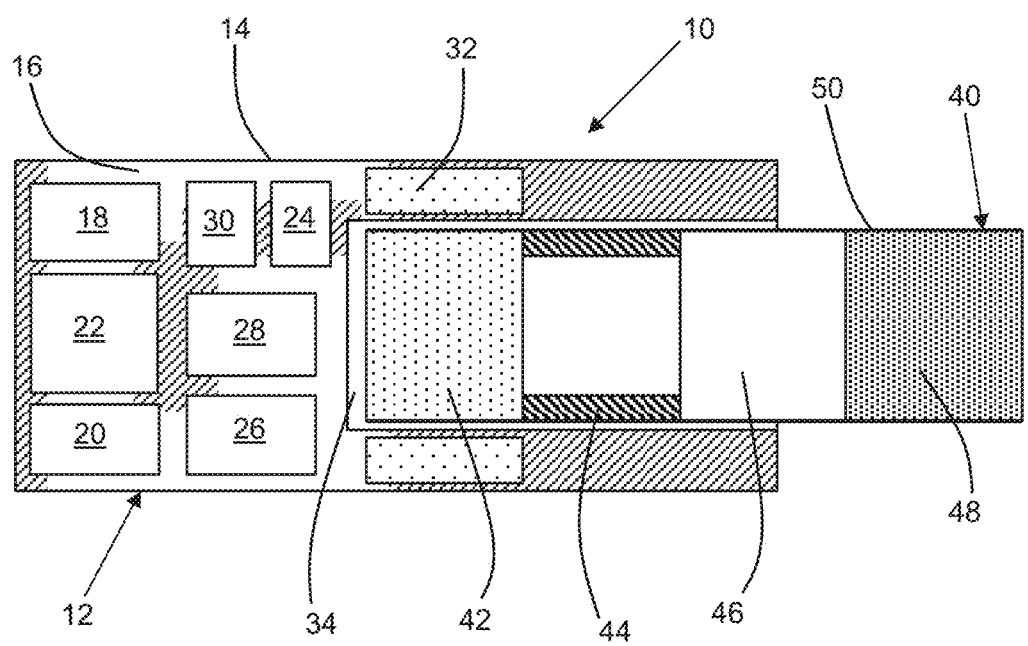
FIG. 1 is a cross-sectional view of an aerosol-generating system comprising an aerosol-generating device in accordance with at least one example embodiment.

Various example embodiments will now be described more fully with reference to the accompanying drawings in which some example embodiments are shown. However, specific structural and functional details disclosed herein are merely representative for purposes of describing example embodiments. Thus, the embodiments may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various features will be described in detail with reference to the attached drawings. However, example embodiments described are not limited thereto.

At least one example embodiment relates to an aerosol-generating device.

In at least one example embodiment, an aerosol-generating device comprises a first power supply configured to supply electrical energy to at least one heater and a second power supply configured to supply electrical energy to a controller. Separating the supply of electrical energy to the at least one heater from the supply of electrical energy to the controller may facilitate the use of a measure of the electrical energy remaining in the first power supply as an indication of a level of consumption of an aerosol-forming substrate. The amount of electrical energy depleted from the first power supply in the aerosol-generating device may be closely indicative of the amount of time for which an aerosol-forming substrate has been heated. Therefore, the controller may be configured to measure at least one of an amount of electrical energy stored within the first power supply and an amount of electrical energy depleted from the first power supply. The controller is further configured to estimate an amount of an aerosol-forming substrate remaining based on the measured amount of electrical energy.

Separating the supply of electrical energy to the at least one heater from the supply of electrical energy to the controller may provide improved control over the supply of electrical energy to the at least one heater. This may provide a reliable and consistent heating of an aerosol-forming substrate.

The first power supply may be a rechargeable first power supply. A rechargeable first power supply may facilitate repeated vaping of the aerosol-generating device with multiple aerosol-forming substrates. The rechargeable first power supply has an increased and/or maximum capacity for storing electrical energy. The controller may be configured to limit charging of the rechargeable first power supply to an amount that is less than the increased and/or maximum capacity. In example embodiments in which the amount of electrical energy remaining in the first power supply is used as in indication of an amount of an aerosol-forming substrate remaining, charging of the rechargeable first power supply may be limited. The total capacity of a rechargeable power supply may decrease as the number of charge and discharge cycles increases. That is, after repeated charging and discharging of a rechargeable power supply, the total capacity of the rechargeable power supply may decrease so that it is less than the maximum storage capacity of the rechargeable power supply at the time of manufacture. Therefore, limiting the charging of the rechargeable first power supply to an amount that is less than the increased and/or maximum capacity of the rechargeable first power supply may ensure that the rechargeable first power supply is always recharged to the same amount of stored electrical energy, regardless of any decrease in the total capacity of the rechargeable first power supply over time. The controller is configured to limit charging of the rechargeable first power supply to an amount of ranging from about 70 percent to about 80 percent of the increased and/or maximum capacity of the rechargeable first power supply.

In at least one example embodiment, the aerosol-generating device may comprise an additional power supply configured to recharge the rechargeable first power supply. The additional power supply may comprise the second power supply. The additional power supply may comprise a third power supply. The rechargeable first power supply may be charged with an amount of electrical energy that is sufficient only for heating a single aerosol-forming substrate until the aerosol-forming substrate has been depleted. In at least one example embodiment, the level of electrical energy remaining in the rechargeable first power supply may be directly correlated with the amount of aerosol-forming substrate remaining, as described herein. In at least one example embodiment, providing an additional power supply allows the aerosol-generating device to recharge the rechargeable first power supply each time the aerosol-forming substrate is replenished or replaced. To accommodate multiple cycles of charging the rechargeable first power supply by the additional power supply, the first rechargeable power supply has a first increased and/or maximum capacity for storing electrical energy, wherein the additional power supply has a second increased and/or maximum capacity for storing electrical energy, and wherein the second increased and/or maximum capacity is greater than the first increased and/or maximum capacity.

The second power supply may be a rechargeable second power supply. Where present, the third power supply may be a rechargeable third power supply.

The aerosol-generating device may comprise a power connector configured to receive electrical energy from an external power source. The aerosol-generating device may be configured so that electrical energy received from an external power source through the power connector recharges at least one of the first power supply, the second power supply and, where present, the third power supply.

At least one of the first power supply, the second power supply and, where present, the third power supply may be removable from the aerosol-generating device. A removable power supply may be configured for recharging outside of the aerosol-generating device. A removable power supply may be removed from the aerosol-generating device and replaced with an alternative power supply. In at least one example embodiment, a discharged power supply may be removed and replaced with a charged power supply. A removable power supply may be replaced with an identical power supply. A removable power supply may be replaced with a different power supply.

Each of the first, second and, where present, third power supplies may be a DC voltage source. In at least one example embodiment, each power supply is a battery. In at least one example embodiment, each power supply may be a Nickel-metal hydride battery, a Nickel cadmium battery, or a Lithium based battery. The Lithium based battery may be a Lithium-Cobalt, a Lithium-Iron-Phosphate or a Lithium-Polymer battery. The first, second and third power supplies may be the same type of power supply. The first, second and third power supplies may be different types of power supply.

In at least one example embodiment, the aerosol-generating device may comprise at least one additional electrical component. In at least one example embodiment, the second power supply is configured to supply electrical energy to the at least one additional electrical component. The at least one additional electrical component may comprise at least one of a sensor, an input device and a feedback device.

In at least one example embodiment, the controller is configured to measure at least one of an amount of electrical energy stored in the first power supply and an amount of electrical energy depleted from the first power supply. The aerosol-generating device may be configured to communicate via a feedback device a level of charge remaining within the first power supply.

In at least one example embodiment, the controller is configured to measure an amount of electrical energy stored within the first power supply and an amount of electrical energy depleted from the first power supply. The controller is further configured to estimate an amount of an aerosol-forming substrate remaining based on the measured amount of electrical energy. The aerosol-generating device may be configured to communicate via a feedback device a level of an aerosol-forming substrate remaining.

In at least one example embodiment, the at least one additional electrical component comprises at least one sensor. The at least one sensor may comprise at least one of a temperature sensor and an airflow sensor.

A temperature sensor may be configured to measure the temperature of at least one of a temperature of the at least one heater and a temperature of an aerosol-forming substrate.

An airflow sensor may be configured to measure airflow through the aerosol-generating device to determine when an adult vaper is drawing on the aerosol-generating device or an aerosol-generating system comprising the aerosol-generating device. The controller may be configured to modify the rate at which electrical energy is supplied from the first power supply to the at least one heater based on a measured airflow through the aerosol-generating device. The controller may be configured to increase the rate at which electrical energy is supplied from the first power supply to the at least one heater when airflow through the aerosol-generating device is increased. The controller may be configured to decrease the rate at which electrical energy is supplied from the first power supply to the at least one heater when airflow through the aerosol-generating device is decreased.

In at least one example embodiment, the at least one additional electrical component comprises at least one input device. The at least one input device may comprise at least one of a push-button input device, a capacitive input device, and an audio input device.

In at least one example embodiment, the at least one additional electrical component comprises at least one feedback device. The at least one feedback device may comprise at least one of a LED, a LCD, a speaker, and a haptic feedback device.

The at least one electric heater may comprise at least one of a resistive heater and an inductive heater.

The aerosol-generating device may comprise a liquid storage portion and a liquid aerosol-forming substrate stored within the liquid storage portion. During vaping, the electric heater heats a small portion of the liquid aerosol-forming substrate to vaporize the small portion of the liquid aerosol-forming substrate. The liquid aerosol-forming substrate may comprise a tobacco-containing material comprising volatile tobacco flavor compounds which are released from the liquid upon heating. Alternatively, or in addition, the liquid aerosol-forming substrate may comprise a non-tobacco material. The liquid aerosol-forming substrate may include water, solvents, ethanol, plant extracts and natural or artificial flavors. The liquid aerosol-forming substrate further comprises an aerosol former.

As used herein, the term 'aerosol former' is used to describe any suitable known compound or mixture of compounds that, in during vaping, facilitates formation of an aerosol. Suitable aerosol formers are substantially resistant to thermal degradation at the operating temperature of the aerosol-generating device. Examples of suitable aerosol formers are glycerine and propylene glycol.

The aerosol-generating device may further comprise a capillary wick in communication with the liquid storage portion. The capillary wick is arranged to be in contact with the liquid aerosol-forming substrate within the liquid storage portion. During vaping, the liquid aerosol-forming substrate is transferred from the liquid storage portion along the capillary wick by capillary action, where the liquid aerosol-forming substrate is heated by the electric heater. In at least one example embodiment, the electric heater comprises an inductive heater. The aerosol-generating device may further comprise a susceptor. During vaping, the inductive heater heats the susceptor and liquid aerosol-forming substrate is transferred from the liquid storage portion to the susceptor via the capillary wick.

The aerosol-generating device may comprise a cavity for receiving an aerosol-generating article comprising an aerosol-forming substrate. The at least one electric heater may comprise an elongate heater configured for insertion into an aerosol-generating article when an aerosol-generating article is received within the cavity. The elongate heater may have any suitable shape to facilitate insertion into the aerosol-generating article. In at least one example embodiment, the elongate heater may be a heater blade. The elongate heater is a resistive heater.

The at least one heater may comprise a heater adjacent to an outer surface of an aerosol-generating article when the aerosol-generating article is received within the cavity. The at least one heater may comprise a substantially annular heater configured to surround at least a portion of an aerosol-generating article when an aerosol-generating article is received within the cavity. The at least one heater may comprise a substantially planar heater positioned adjacent to an end of an aerosol-generating article when an aerosol-generating article is received within the cavity. The heater positioned adjacent to an outer surface of an aerosol-generating article when the aerosol-generating article is received within the cavity is preferably an inductive heater.

As used herein, the terms 'inner' and 'outer' are used to refer to relative positions of components of the aerosol-generating device, or parts of components of the aerosol-generating device. For example, an inner surface of a component faces toward an interior of the device and an outer surface of a component faces toward the exterior of the device.

At least one example embodiment relates to an aerosol-generating device. The aerosol-generating device comprises at least one electric heater and a first power supply configured to supply electrical energy to the at least one electric heater. The aerosol-generating device further comprises a controller configured to control the supply of electrical energy from the first power supply to the at least one electric heater and a second power supply configured to supply electrical energy to the controller.

In at least one example embodiment, the first power supply is configured to supply electrical energy only to the at least one electric heater.

The aerosol-generating device may comprise any of the features described herein with reference to the example embodiments.

At least one example embodiment relates to an aerosol-generating system. The aerosol-generating system comprises an aerosol-generating article and an aerosol-generating device, in accordance with any of the example embodiments described above. The aerosol-generating article comprises an aerosol-forming substrate. The aerosol-generating device comprises a cavity for receiving the aerosol-generating article.

The aerosol-generating article may comprise a liquid storage portion and a liquid aerosol-forming substrate stored within the liquid storage portion. During vaping, the electric heater heats a portion of the liquid aerosol-forming substrate to vaporize the portion of the liquid aerosol-forming substrate. The liquid aerosol-forming substrate comprises a tobacco-containing material comprising volatile tobacco flavor compounds which are released from the liquid upon heating. In at least one example embodiment, the liquid aerosol-forming substrate may comprise a non-tobacco material. The liquid aerosol-forming substrate may include water, solvents, ethanol, plant extracts and natural or artificial flavors. The liquid aerosol-forming substrate further comprises an aerosol former.

The aerosol-generating article may further comprise a capillary wick in communication with the liquid storage portion. The capillary wick is arranged to be in contact with the liquid aerosol-forming substrate within the liquid storage portion. During vaping, liquid aerosol-forming substrate is transferred from the liquid storage portion along the capillary wick by capillary action, where the liquid aerosol-forming substrate is heated by the electric heater. In example embodiments in which the electric heater comprises an inductive heater, the aerosol-generating article may further comprise a susceptor. During vaping, the inductive heater heats the susceptor and liquid aerosol-forming substrate is transferred from the liquid storage portion to the susceptor via the capillary wick.

The aerosol-generating article may comprise a solid aerosol-forming substrate. The aerosol-forming substrate may comprise tobacco. The aerosol-forming substrate may comprise a tobacco-containing material containing volatile tobacco flavor compounds which are released from the substrate upon heating. The aerosol-forming substrate may comprise a non-tobacco material. The aerosol-forming substrate may comprise tobacco-containing material and non-tobacco containing material. In example embodiments in which the electric heater comprises an inductive heater, the aerosol-generating article may further comprise a susceptor. Preferably, the susceptor is positioned within the aerosol-forming substrate.

The aerosol-forming substrate may include at least one aerosol-former. Suitable aerosol-formers include, but are not limited to: polyhydric alcohols, such as propylene glycol, triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate In at least one example embodiment, the aerosol formers are polyhydric alcohols or mixtures thereof, such as propylene glycol, triethylene glycol, 1,3-butanediol and, glycerine.

The aerosol-forming substrate may comprise a single aerosol former. The aerosol-forming substrate may comprise a combination of two or more aerosol formers.

The aerosol-forming substrate may have an aerosol former content of greater than about 5 percent on a dry weight basis.

The aerosol-forming substrate may have an aerosol former content of ranging from about 5 percent to about 30 percent on a dry weight basis.

The aerosol-forming substrate may have an aerosol former content of about 20 percent on a dry weight basis.

The aerosol-generating article may comprise an aerosol-forming substrate comprising a first aerosol-forming substrate comprising a nicotine source and a second aerosol-forming substrate comprising an acid source. During vaping, the electric heater heats the first and second aerosol-forming substrates to volatilize the nicotine and the acid so that the nicotine and acid are reacted together in the gas phase to form an aerosol of nicotine salt particles. In at least one example embodiment in which the electric heater comprises an inductive heater, the aerosol-generating article may further comprise a susceptor. The susceptor is positioned to heat both the nicotine source and the acid source.

The nicotine source may comprise one or more of nicotine, nicotine base, a nicotine salt, such as nicotine-HCl, nicotine-tartrate, or nicotine-ditartrate, or a nicotine derivative.

The nicotine source may comprise natural nicotine or synthetic nicotine.

The nicotine source may comprise pure nicotine, a solution of nicotine in an aqueous or non-aqueous solvent or a liquid tobacco extract.

The nicotine source may further comprise an electrolyte forming compound. The electrolyte forming compound may be selected from the group consisting of alkali metal hydroxides, alkali metal oxides, alkali metal salts, alkaline earth metal oxides, alkaline earth metal hydroxides and combinations thereof.

In at least one example embodiment, the nicotine source may comprise an electrolyte forming compound selected from the group consisting of potassium hydroxide, sodium hydroxide, lithium oxide, barium oxide, potassium chloride, sodium chloride, sodium carbonate, sodium citrate, ammonium sulfate and combinations thereof.

In at least one example embodiment, the nicotine source may comprise an aqueous solution of nicotine, nicotine base, a nicotine salt or a nicotine derivative and an electrolyte forming compound.

In at least one example embodiment, the nicotine source may further comprise other components including, but not limited to, natural flavors, artificial flavors, and antioxidants.

The acid source may comprise an organic acid or an inorganic acid. In at least one example embodiment, the acid source comprises an organic acid. In at least one example embodiment, the acid source comprises a carboxylic acid. In at least one example embodiment, the acid source comprises lactic acid or an alpha-keto or 2-oxo acid.

In at least one example embodiment, the acid source comprises an acid selected from the group consisting of lactic acid, 3-methyl-2-oxopentanoic acid, pyruvic acid, 2-oxopentanoic acid, 4-methyl-2-oxopentanoic acid, 3-methyl-2-oxobutanoic acid, 2-oxooctanoic acid and combinations thereof. In at least one example embodiment, the acid source comprises lactic acid or pyruvic acid.

FIG. 1 shows an aerosol-generating system 10 comprising an aerosol-generating device 12 in accordance with at least one example embodiment. The aerosol-generating device 12 comprises a housing 14 defining an internal compartment 16.

The aerosol-generating device 12 comprises a first power supply 18, a second power supply 20, a third power supply 22, an airflow sensor 24, a feedback device 26, a controller 28, an input device 30, and an electric heater 32, all positioned within the internal compartment 16. The electric heater 32 is an annular inductive heater. The first power supply 18 is configured to supply electrical energy only to the electric heater 32. The second power supply 20 is configured to supply electrical energy to the airflow sensor 24, the feedback device 26, the controller 28 and the input device 30. The third power supply 22 is configured to supply electrical energy to the first power supply 18 for recharging the first power supply 18. The third power supply 22 has a larger capacity for storing electrical energy than the first power supply 18. The controller 28 is configured to control the supplies of electrical energy from the first, second and third power supplies 18, 20, 22 to the other electrical components within the internal compartment 16.

The aerosol-generating system 10 further comprises an aerosol-generating article 40 that is received within a cavity 34 of the aerosol-generating device 12 during vaping. The aerosol-generating article 40 comprises an aerosol-forming substrate 42, a hollow acetate tube 44, a polymeric filter 46, a mouthpiece 48 and an outer wrapper 50. The aerosol-forming substrate 42 comprises a susceptor dispersed within a plug of tobacco and the mouthpiece 48 comprises a plug of cellulose acetate fibers.

During vaping, the controller 28 supplies electrical energy from the first power supply 18 to the electric heater 32 to inductively heat the susceptor within the aerosol-forming substrate 42. As the susceptor is heated, the tobacco within the aerosol-forming substrate 42 is heated and volatile compounds are released from the tobacco for delivery to the adult vaper. Electrical energy is supplied from the second power supply 20 to the feedback device 26 to provide feedback to the adult vaper to indicate the start and finish of a heating cycle. At the end of the heating cycle, electrical energy is supplied from the third power supply 22 to the first power supply 18 to recharge the first power supply 18.

Figure 2:
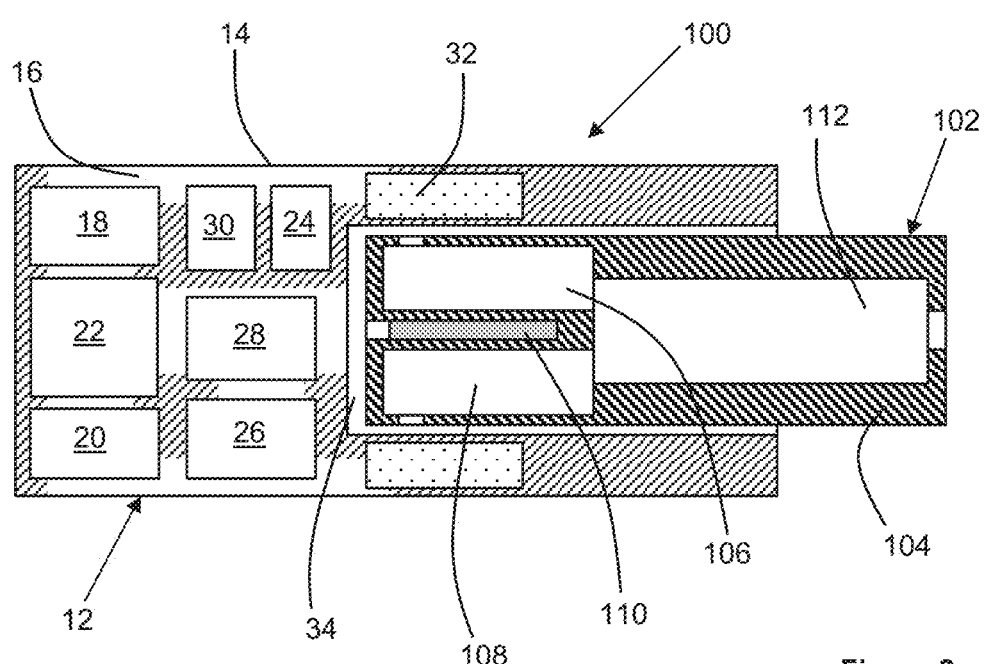
FIG. 2 is a cross-sectional view of an aerosol-generating system comprising an aerosol-generating device in accordance with at least one example embodiment.

FIG. 2 shows an alternative embodiment of an aerosol-generating system 100. In at least one example embodiment, the aerosol-generating system 100 comprises an aerosol-generating device 12 that is substantially the same as the aerosol-generating device 12 described with reference to FIG. 1. Therefore, like reference numerals are used to designate like parts and the function of both aerosol-generating devices 12 is the same.

The aerosol-generating system 100 shown in FIG. 2 comprises an aerosol-generating article 102 comprising a cartridge 104 defining a first compartment 106 containing a nicotine source and a second compartment 108 containing an acid source. The nicotine source may comprise a sorption element, such as a polytetrafluoroethylene (PTFE) wick, with nicotine adsorbed thereon. The acid source may comprise a sorption element, such as a PTFE wick, with acid adsorbed thereon. The acid may be, for example, lactic acid.

The aerosol-generating article 102 further comprises a susceptor 110 positioned between the first and second compartments 106, 108. The aerosol-generating article 102 further comprises a third compartment 112 positioned downstream of the first and second compartments 106, 108. The third compartment 112 is in fluid communication with the first and second compartments 106, 108.

During vaping, the controller 28 supplies electrical energy from the first power supply 18 to the electric heater 32 to inductively heat the susceptor 110 within the aerosol-generating article 102. Heating of the susceptor 110 heats the first and second compartments 106, 108, which volatilizes the nicotine and the acid within the first and second compartments respectively. The nicotine and acid vapors mix within the third compartment 112 and react to form an aerosol comprising nicotine salt particles for delivery to the adult vaper. Electrical energy is supplied from the second power supply 20 to the feedback device 26 to provide feedback to the adult vaper to indicate the start and finish of a heating cycle. At the end of the heating cycle, electrical energy is supplied from the third power supply 22 to the first power supply 18 to recharge the first power supply 18.

Figure 3:
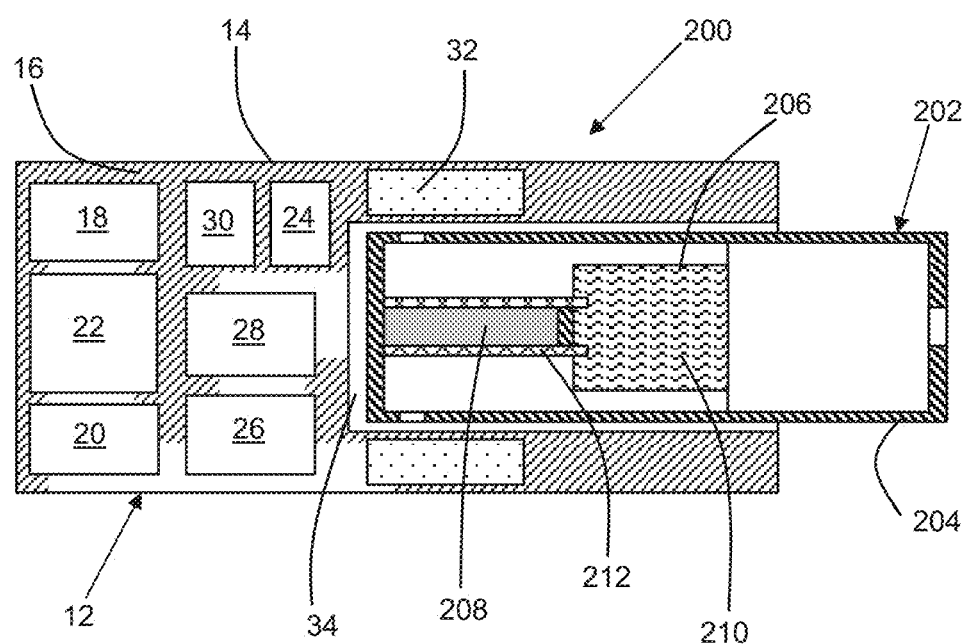
FIG. 3 is a cross-sectional view of an aerosol-generating system comprising an aerosol-generating device in accordance with at least one example embodiment.

FIG. 3 shows an alternative aerosol-generating system 200. The aerosol-generating system 200 comprises an aerosol-generating device 12 according to at least one example embodiment that is substantially identical to the aerosol-generating device 12 described with reference to FIGS. 1 and 2. Therefore, like reference numerals are used to designate like parts and the function of each aerosol-generating device 12 is the same.

The aerosol-generating system 200 shown in FIG. 3 comprises an aerosol-generating article 202 comprising a cartridge 204 housing a liquid storage portion 206 and a susceptor 208. A liquid aerosol-forming substrate 210 is stored within the liquid storage portion 206 and a capillary wick 212 extends between the liquid storage portion 206 and the susceptor 208. The capillary wick 212 substantially surrounds the susceptor 208.

During vaping, liquid aerosol-forming substrate 210 is transferred by capillary action along the capillary wick 212 from the liquid storage portion 206 to the susceptor 208. The controller 28 supplies electrical energy from the first power supply 18 to the electric heater 32 to inductively heat the susceptor 208 within the aerosol-generating article 202. Heating of the susceptor 208 heats and volatilizes the liquid aerosol-forming substrate 210 from the capillary wick 212 for delivery to the adult vaper. Electrical energy is supplied from the second power supply 20 to the feedback device 26 to provide feedback to the adult vaper to indicate the start and finish of a heating cycle. At the end of the heating cycle, electrical energy is supplied from the third power supply 22 to the first power supply 18 to recharge the first power supply 18.

The exemplary embodiments described above illustrate but are not limiting. In view of the above discussed exemplary embodiments, other embodiments consistent with the above exemplary embodiments will now be apparent to one of ordinary skill in the art.

The invention claimed is:

1. An aerosol-generating device comprising:
   a housing of the aerosol-generating device, the housing defining an internal compartment adjacent a first end of the housing and a cavity adjacent a second end opposite the first end of the housing, the cavity configured to receive an aerosol-generating article, the aerosol-generating article including,
   a first compartment including nicotine,
   a second compartment including an acid source,
   a susceptor configured to be positioned between the first compartment and the second compartment, and
   a third compartment defining a space between outlets of first and second compartments and an outlet of the aerosol-generating device, wherein the third compartment configured to be fluidly coupled to the first compartment and the second compartment and the third compartment downstream of the first compartment and the second compartment;
   at least one electric heater in the housing adjacent the cavity and configured to heat the susceptor of the aerosol-generating article to form nicotine and acid vapors at the outlets of the first and second compartments, respectively; wherein the nicotine and acid vapors mix within the third compartment and react to form an aerosol comprising nicotine salt particles for delivery to the outlet of the aerosol-generating device;
   the at least one electric heater including an annular inductive heater extending about the first compartment, the second compartment, and the susceptor;
   at least one airflow sensor in the internal compartment of the housing;
   a first power supply in the internal compartment of the housing, the first power supply configured to supply electrical energy only to the at least one electric heater, the first power supply including a battery;
   a second power supply in the internal compartment of the housing, the second power supply configured to supply electrical energy to the at least one airflow sensor, the second power supply including a battery;
   a third power supply in the internal compartment of the housing, the third power supply being rechargeable, and the third power supply configured to supply electrical energy to the first power supply, the third power supply including a battery; a controller in the internal compartment of the housing, the controller configured to control a supply of electrical energy from the first power supply to the at least one electric heater during a heating cycle, and at an end of the heating cycle, supply power from the third power supply to the first power supply so as to recharge the first power supply, and the second power supply configured to supply electrical energy to the controller; and
   at least one additional electrical component, the at least one additional electrical component including a feedback device, the second power supply configured to supply electrical energy to the feedback device such that the feedback device provides feedback indicating a start and the end of the heating cycle.

2. The aerosol-generating device according to claim 1, wherein the first power supply is a rechargeable first power supply.

3. The aerosol-generating device according to claim 2, wherein the rechargeable first power supply has a maximum capacity for storing electrical energy.

4. The aerosol-generating device according to claim 2, wherein the first rechargeable power supply has a first maximum capacity for storing electrical energy,
   wherein the third power supply has a second maximum capacity for storing electrical energy, and
   wherein the second maximum capacity is greater than the first maximum capacity.

5. The aerosol-generating device according to claim 1, wherein the at least one additional electrical component further comprises:
   a sensor, an input device, or any combination thereof.

6. The aerosol-generating device according to claim 1, wherein the first power supply, the second power supply, and the third power supply are configured to supply electrical energy only to the aerosol-generating device.

7. The aerosol-generating device of claim 1, further comprising:
   a power connector configured to receive electrical energy from an external power source such that the electrical energy from the external power source recharges one or more of the first power supply, the second power supply, or the third power supply.

* * * * *